United States Patent [19]
Kim

[11] Patent Number: 5,740,302
[45] Date of Patent: *Apr. 14, 1998

[54] CIRCUIT FOR INSERTING AND SEPARATING A FIELD COUNT INTO A LUMINANCE SIGNAL AND METHOD THEREFOR

[75] Inventor: Yong-je Kim, Suwon, Rep. of Korea

[73] Assignee: SamSung Electronics Co., Ltd., Kyungki-do, Rep. of Korea

[*] Notice: The terminal 40 months of this patent has been disclaimed.

[21] Appl. No.: 763,291

[22] Filed: Sep. 20, 1991

[30] Foreign Application Priority Data

Oct. 31, 1990 [KR] Rep. of Korea .............. 90-17587

[51] Int. Cl.$^6$ ............................................. H04N 9/80
[52] U.S. Cl. .................. 386/33; 386/109; 348/427; 348/429
[58] Field of Search .............. 358/310, 335, 358/11, 12, 14, 15, 140, 141, 142, 146, 138; 360/33.1, 35.1, 20, 27, 28; 348/526, 461, 463, 464, 465, 468, 423, 473–479, 427–431; 386/27, 33, 109, 112; H04N 5/92, 5/917, 7/26, 5/08, 7/00, 11/00, 7/01, 11/20, 7/12, 11/02, 11/04

[56] References Cited

U.S. PATENT DOCUMENTS

| | | | |
|---|---|---|---|
| 4,831,463 | 5/1989 | Faroudja | 358/310 |
| 4,912,549 | 3/1990 | Altman et al. | 348/473 |
| 5,012,239 | 4/1991 | Kurata et al. | 348/526 |
| 5,023,727 | 6/1991 | Boyd et al. | 386/39 |
| 5,025,496 | 6/1991 | Canfield | 348/526 |
| 5,063,457 | 11/1991 | Ishikawa et al. | 358/330 |
| 5,097,348 | 3/1992 | Suetaka | 386/95 |
| 5,113,262 | 5/1992 | Strolle et al. | 358/323 |
| 5,179,451 | 1/1993 | Takeshita et al. | 386/113 |
| 5,208,707 | 5/1993 | Kim | 386/109 |
| 5,220,465 | 6/1993 | Kim et al. | 386/109 |
| 5,303,059 | 4/1994 | Kim | 386/109 |
| 5,321,507 | 6/1994 | Ko et al. | 348/427 |

*Primary Examiner*—Thai Tran
*Attorney, Agent, or Firm*—Robert E. Bushnell, Esq.

[57] ABSTRACT

In a video recording apparatus, a frequency folding information inserting circuit comprises an E/O field detector for detecting whether the present video signal is of an even number or odd number field, a frequency folding information generator for generating frequency folding information representing the state of frequency folding according to the detected result of the E/O field detector, an adder for adding the folded video signal to the frequency folding information, and a position setter connected between the adder and the frequency folding information generator for supplying the generated frequency folding information to the adder at any arbitrary time. In a video reproducing apparatus, a frequency folding information separating circuit comprises a position detector for detecting the position where frequency folding information is inserted in the reproduced video signal, and a frequency folding information separator for separating the frequency folding information included in the reproduced video signal according to the detected result of the position detector.

22 Claims, 4 Drawing Sheets

CIRCUIT FOR INSERTING AND SEPARATING A FIELD COUNT INTO A LUMINANCE SIGNAL AND METHOD THEREFOR

BACKGROUND OF THE INVENTION

This invention relates to a circuit for inserting and separating frequency folding information using a folding carrier wave and the method for generating frequency folding information in a video recording/reproducing apparatus in which the amount of information is increased by folding a high frequency component video signal into a low frequency component video signal during recording and reproducing.

Generally, a video recording/reproducing apparatus records or reproduces video signals on or from a recording medium. However, the video signal recorded or reproduced on or from a video recording/reproducing apparatus has the bandwidth of the video signal limited according to the quality of the recording medium.

A video recording/reproducing apparatus should bring about inclusion of a large amount of information in a limited bandwidth in order to improve horizontal resolution. The technique for improving horizontal resolution by including a large amount of information in a limited bandwidth is described in U.S. patent application Ser. No. 07/569,029 on the invention titled "Video Signal Recording System" and filed on Aug. 17, 1990, by the same applicant as this case, assigned to Samsung Electronics Co. of Korea.

According to the above U.S. patent application Ser. No. 07/569,029, after video signal components distributed in the frequency band higher than the frequency band limited by the recording medium (hereinafter referred to as a base band) in video signals are detected and attenuated, the attenuated high frequency video signal component is mixed with a folding carrier wave for placement in the base band, and the above mixed high frequency video signal component is mixed for inclusion in the video signal component within the base band. Here, the frequency of the folding carrier wave is chosen so as to maximize the distances between the luminance signal in the base band and the folding carrier wave in the time, vertical and horizontal directions. The folding carrier wave thus selected is suitably placed at half the maximum vertical frequency, half the maximum time frequency (i.e. Fukinuki hole) in the time and vertical dimensions, and at approximately 5 MHz in the horizontal direction.

As a result, the phase of the folding carrier wave varies by a specified amount between the fields of a frame. Therefore information on the phase of the folding carrier wave according to separate fields must be recorded with the video signals so that, during reproduction, the high frequency video signal component folded into the low frequency video signal component in the base band can be unfolded and reproduced accurately into the original frequency band.

SUMMARY OF THE INVENTION

Accordingly, it is an object of this invention to provide a frequency folding information inserting circuit for inserting information on the phase of the folding carrier wave into video signals in a video recording apparatus for recording video information of the frequency band higher than the base band on a recording medium by folding the video information of the frequency band higher than the base band into the video signal component of the base band so as to improve horizontal resolution.

It is another object of this invention to provide a frequency folding information separating circuit which, in a video reproducing apparatus, is able to separate information on the phase of the folding carrier wave from the read out video signals so as to read out and reproduce, from a recording medium, video signals which have video signal components of high frequencies higher than the base band and are folded into video signal components of the base band. If is further object of this invention to provide a frequency folding information generating method which generates a frequency folding information to represent a frequency folding state of the folded video signal in a video recording apparatus for folding a high frequency video signal into a low frequency video signal and recording the folded video signal so as to store a video signal having a full bandwidth on a recording medium having a limited bandwidth.

To accomplish the first object stated above, a frequency folding information inserting circuit according to this invention comprises:

an even/odd number field detector for detecting whether the video signal on the input terminal is of an odd number field or an even number field;

a frequency folding information generator for generating frequency folding information representing frequency folding state according to the detected result of the even/odd number field detector;

an adder for inserting the frequency folding information into the video signal supplied at the input terminal; and a position setter connected between the adder and the frequency folding information generator for supplying the generated frequency folding information to the adder at an arbitrary point of time.

To accomplish the second object stated above, a frequency folding information separating circuit according to this invention comprises:

a position detector for detecting the position where frequency folding information has been inserted within the reproduced video signal; and a frequency folding information separator for separating the frequency folding information included in the reproduced video signal according to the detected result of the position detector.

To accomplish the third object stated above, there is provided a frequency folding information generating method so as to represent a frequency folding state of a folded video signal in a video recording apparatus for folding a high frequency video signal into a low frequency video signal and for recording the folded video signal of a full bandwidth on a recording medium of a limited bandwidth, the method comprising the steps of:

separating a horizontal synchronous signal and a vertical synchronous signal from the folded video signal including synchronous signals;

generating a standard clock pulse train having a frequency of a predetermined times higher than that of the horizontal synchronous signal;

counting up a scanning period of the horizontal synchronous signal according to the standard clock pulse train;

comparing the counted value with a value corresponding to a half-period of the horizontal synchronous signal when a blanking duration of the vertical synchronous signal starts during the counting-up step;

generating an even/odd number field detection signal of a predetermined logic state according to the compared result at the comparing step;

generating a frequency folding information according to the logic state of the generated even/odd number field detection signal; and setting a position of a scanning line for inserting the frequency folding information.

BRIEF DESCRIPTION OF DRAWINGS

The above objects and advantages of the invention will become apparent with the following descriptions with reference to the accompanying drawings.

DETAILED DESCRIPTION OF THE INVENTION

Figure 1:
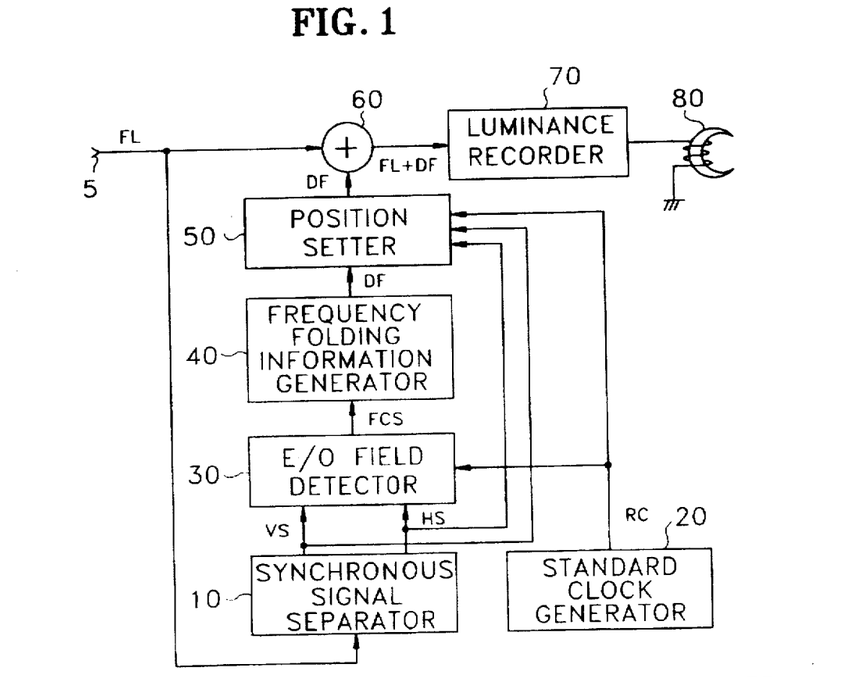
FIG. 1 is a block diagram of one embodiment of a frequency folding information inserting circuit according to this invention.

FIG. 1 is a block diagram of an embodiment of a circuit for inserting frequency folding information according to this invention. In FIG. 1, input terminal 5 is connected to the frequency folder (not shown) to receive folded luminance signals including synchronous signals. Also, input terminal 5 is connected to the first input terminal of the adder 60 and the input terminal of the synchronous signal separator 10. The output terminal of the standard clock generator 20 is connected to the third input terminal of the even/odd number field detector 30 (hereinafter, referred to as E/O field detector) and the third input terminal of the position setter 50. The first and second output terminals of the synchronous signal separator 10 are connected to the first and second input terminals of the E/O field detector 30 and the first and second input terminals of the position setter 50. The output terminal of the E/O field detector is connected to the input terminal of the frequency folding information generator 40. The output terminal of the frequency folding information generator 40 is connected to the fourth input terminal of the position setter 50. The output terminal of the position setter 50 is connected to the second input terminal of the adder 60. The output terminal of the adder 60 is connected to the input terminal of the luminance recorder 70. The output terminal of the luminance recorder 70 is connected to the magnetic head.

In operation of the circuit, the synchronous signal separator 10 separates the horizontal and vertical synchronous signals HS and VS from the folded luminance signal including the synchronous signals and supplies the separated synchronous signals to the E/O field detector 30 and the position setter 50.

The standard clock generator 20 generates a standard clock pulse train RC with a frequency much higher than that of the horizontal synchronous signal HS. For example, the frequency of the standard clock pulse takes a value of 320fH or 640fH. Here, fH is the frequency of the horizontal synchronous signal.

E/O field detector 30 performs a count up of the scanning period of the horizontal synchronous signal HS by the standard clock pulse train RS, and when the blanking period of the vertical synchronous signal VS starts during the count, detects whether the counted value is larger than the value corresponding to the half-period of the horizontal synchronous signal HS. The E/O field detector 30 generates an E/O field detector signal FCS of a predetermined logic state representing the folded luminance signal inputted to the input terminal 5 is an even number field if the counted value is greater than the half-period value of the horizontal synchronous signal HS, and conversely, generates an E/O field detector signal FCS of a logic state opposite to that in the case of an even number field, representing the folded luminance signal inputted to the input terminal 5 is an odd number field if the counted value is less than the half-period value of the horizontal synchronous signal HS.

The frequency folding information generator 40 generates frequency folding information DF increasing by one for every inversion of the logic state of the E/O field detector signal FCS. The above frequency folding information takes a value of "0" after reaching a specified value (actually "3")

That is, frequency folding information generator 40 applied to the frequency folding information inserting circuit of the present invention generates frequency folding information DF increasing by one for every field of the video signals as described above. Accordingly, frequency folding information DF which are repeated by a period of four fields may by inserted into predetermined scanning lines of the video signals. However, in another embodiment of the present invention, the frequency folding information generator 40 may be constructed to generate the frequency folding information DF only for any one field among the four fields of the video signals. On the other hand, in a still other embodiment, the frequency folding information generator 40 may be constructed to generate the frequency folding information DF only for any two fields or three fields among the four fields of the video signals.

Figure 3:
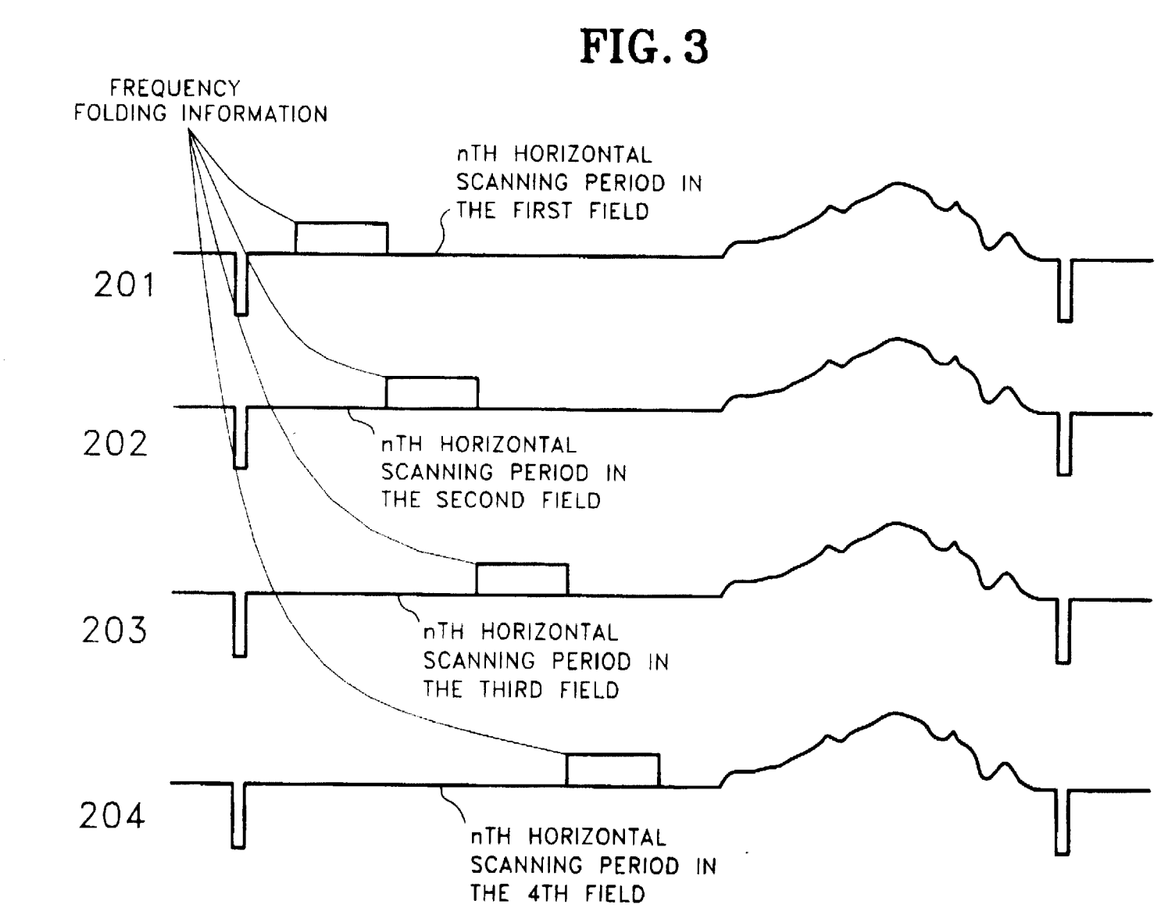
FIG. 3 illustrates video signal waveforms including frequency folding information.

The position setter 50 counts the number of horizontal synchronous signals HS to select the position of the scanning line for inserting the frequency folding information from the vertical synchronous signal VS, and upon reaching the desired scanning line, counts the standard clock pulse train to set the position for inserting frequency folding information. The frequency folding information is inserted between one vertical synchronous signal and a next subsequent vertical synchronous signal, as shown in 201 through 204 of FIG. 3, and more desirably is inserted between any one horizontal synchronous signal and a next subsequent horizontal synchronous signal in an interval between one vertical synchronous signal and a next vertical synchronous signal. Whenever a position is set, the position setter 50 supplies frequency folding information DF generated from the frequency folding information generator 40 to the second input terminal of the adder 60. Here, the frequency folding information DF supplied to the second input terminal of the adder 60 may be, as shown in 201 through 204 of FIG. 3, a pulse in which the inserting position of the pulse may be slightly altered for each field. Here, the pulse may be any pulse having a form such as an impulse or a rectangular wave pulse. Otherwise, the frequency folding information DF may be a code word with the inserting position fixed.

The adder 60 adds the frequency folding information DF inputted from the position setter 50 to the folded luminance signal FL inputted from the input terminal 5 and supplies the result to the luminance recorder 70.

The luminance recorder 70 modulates the frequency of the folded luminance signal including frequency folding information and supplies the result to the magnetic head 80.

The magnetic head 80 records the output of the luminance recorder 70 on magnetic tape.

Figure 2:
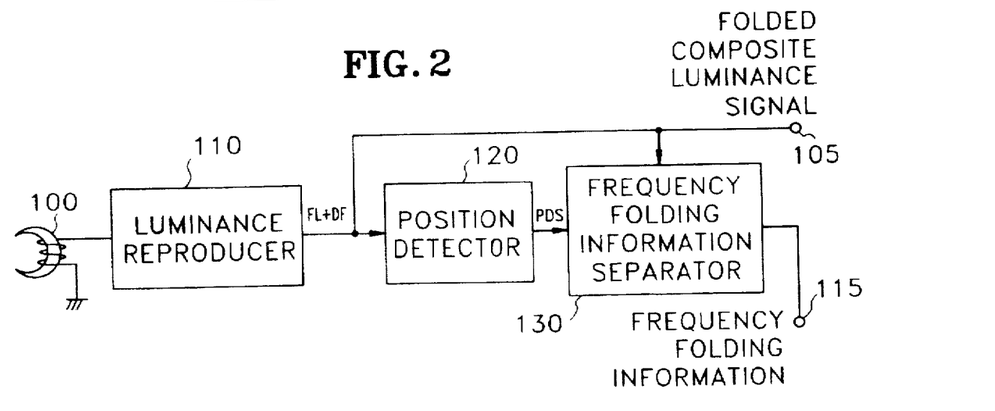
FIG. 2 is a block diagram of one embodiment of a frequency folding information separating circuit according to this invention.

FIG. 2 is a block diagram of one embodiment of circuit for separating frequency folding information according to this invention. In FIG. 2, the magnetic head 100 is connected to the input terminal of the luminance reproducer 110. The output terminal of the luminance reproducer 110 is connected to the first output terminal 105, the input terminal of the position detector 120, and the first input terminal of the frequency folding information separator 130. The output terminal of the position detector 120 is connected to the second input terminal of the frequency folding information separator 130. The output terminal of the frequency folding information separator 130 is connected to the second output terminal 115. The second output terminal 115 is connected to a control terminal of the frequency unfolding circuit (not shown). The first output terminal 105 is connected to the input terminal of an A-D converter (not shown).

In operation of the circuit of FIG. 2, the magnetic head 100 reads out the information recorded on magnetic tape and supplies the result to the luminance reproducer 110.

The luminance reproducer 110 carries out frequency demodulation of the information read out by the magnetic head 100 and generates a luminance signal. Here, the demodulated luminance signal is a signal in which high frequency luminance signal components are folded into low frequency luminance signal components, and also includes frequency folding information.

The position detector 120 separates vertical and horizontal synchronous signals from the luminance signals FL+DF reproduced from the luminance reproducer 110, detects the number of the above separated horizontal synchronous signals during the scanning of the above separated vertical synchronous signal, and generates a position detection signal of a pulse form with a specific logic state for a predetermined time when the horizontal scanning line reaches in which the frequency folding information is inserted.

The frequency folding information detector 130 samples the frequency folding information DF included in the luminance signal FL+DF according to the position detection signal of a pulse with a specific logic state, and after decoding, supplies the result to the output terminal 115.

Figure 4:
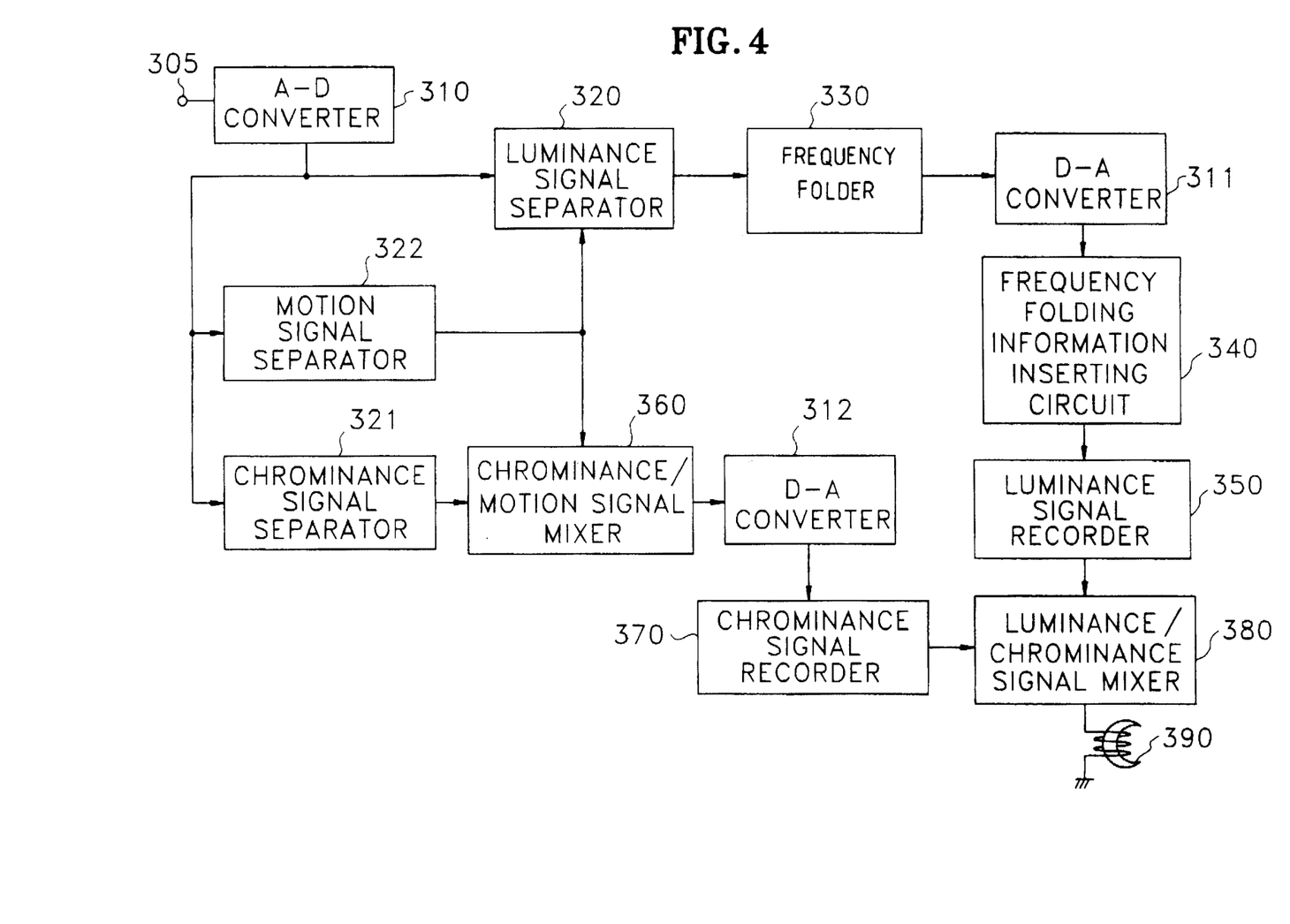
FIG. 4 is a block diagram of a video recording system to which a frequency folding information inserting circuit according to this invention is applied.

FIG. 4 is a block diagram of a video recording system to which a frequency folding information inserting circuit according to this invention is applied. Referring to FIG. 4, the frequency folding information inserting circuit 340 is connected between D-A converter 311 and luminance signal recorder 350.

However, the frequency folding information inserting circuit 340 according to this invention may be installed between the frequency folder 330 and the D-A converter 311 in a video recording system to which the circuit 340 of this invention is applied, without changing the effect of the circuit 340. Thus, in the specification, the operation of the video recording system shown in FIG. 4 is described as follows. A-D converter 310 samples the composite video signal according to a sampling clock of about 10MHz and encodes the sampled signal to generate a digital composite video signal. The motion signal separator 322 separates the motion signal representing the amount of movement of pixels on the screen from the digital composite video signal.

The luminance signal separator 320 separates the spatially derived luminance signal and the temporally derived luminance signal from the digital composite video signal, suitably mixes the two separated luminance signals stated above according to the motion signal, and then supplies the mixed luminance signal to the frequency folder 330.

The chrominance signal separator 321 separates the chrominance signal from the digital composite video signal.

The frequency folder 330 attenuates high frequency components of luminance signals (luminance signals above 2.5 MHZ) inputted from the luminance signal separator 320, and performs sub-Nyquist sampling of the attenuated high frequency components by means of the folding carrier wave. The frequency folder 330 also mixes the sampled high frequency luminance signals with low frequency luminance signals, generates a folded luminance signal, performs a low pass filtering of the folded luminance signal so as to provide a high frequency cut off characteristic of 2.5 MHZ thereto, and thus generates a desired folded luminance signal.

The D-A converter 311 converts the digital folded luminance signal inputted from the frequency folder 330 into an analog form.

The frequency folding information inserting circuit 340 inserts frequency folding information according to fields during the nth horizontal scanning period of the analog folded luminance signal inputted from the D-A converter 311.

The luminance signal recorder 350 frequency-modulates the analog folded luminance signal inputted from the frequency folding information inserting circuit 340 to enable recording on a recording medium.

The chrominance/motion signal mixer 360 mixes the motion signal and the chrominance signal and supplies the result to the D-A converter 312.

The D-A converter 312 converts the chrominance signal mixed with the motion signal in digital form inputted from the chrominance/motion signal mixer 360 into in analog form.

The chrominance signal recorder 370 amplitude-modulates the the chrominance signal inputted from the D-A converter 312 according to a carrier wave of approximate 629 MHz.

The chrominance/luminance signal mixer 380 mixes the frequency-modulated luminance signal and the amplitude-modulated chrominance signal and supplies the result to the magnetic recording head 390. The magnetic recording head 390 records the output of the chrominance/luminance signal mixer 380 on a magnetic tape.

Figure 5:
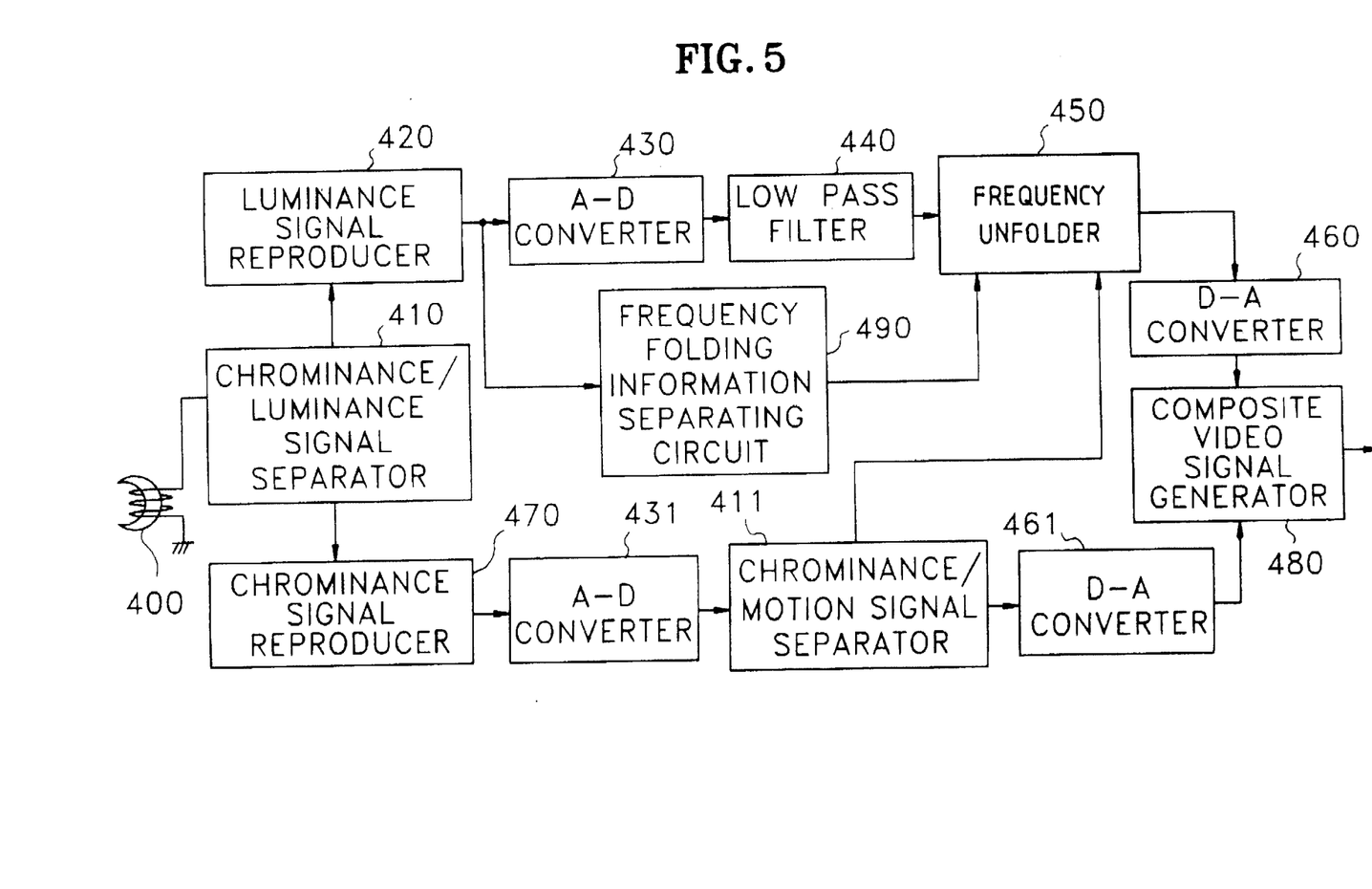
FIG. 5 is a block diagram of a video reproducing system to which a frequency folding information separating circuit according to this invention is applied.

FIG. 5 is a block diagram of a video reproducing system to which the frequency folding information separating circuit according to this invention are applied. In FIG. 5, the frequency folding information separating circuit 490 is connected between the output terminal of the luminance signal reproducer 420 and the control terminal of the frequency unfolder 450.

However, the frequency folding information separating circuit 490 according to this invention may be installed between the A-D converter 430 and the low pass filter 440 in a video reproducing system to which the circuit 490 of this invention is applied, without changing the effect of the circuit 490. Thus, in the specification, the operation of the video reproducing system shown in FIG. 5 is described as follows.

The magnetic reproducing head 400 reads out the information recorded on a video tape and supplies the result to the chrominance/luminance signal separator 410.

The chrominance/luminance signal separator 410 separates the frequency-modulated luminance signal and the amplitude-modulated chrominance signal from the information supplied from the magnetic reproducing lead 400.

The luminance signal reproducer 420 frequency-demodulates the frequency-modulated luminance signal separated from the chrominance/luminance signal separator 410 and generates a luminance signal. A-D converter 430 converts the demodulated luminance signal into a multiple-bit digital video signal.

The low pass filter 440 filters the digital luminance signal and detects luminance signals distributed within the limited bandwidth (within 2.5 MHZ). The frequency folding information separating circuit 490 separates frequency folding information from the luminance signal inputted from the luminance signal reproducer 420 and supplies the result to the frequency unfolder 450.

The frequency unfolder 450 unfolds the high frequency luminance component folded in the filtered luminance signal having a limited bandwidth supplied from the low pass filter 440 into the original frequency band according to the frequency folding information supplied from the above frequency folding information separating circuit 490, suitably mixes the low frequency luminance signal and the high frequency luminance signal according to the magnitude of the motion signal applied from the chrominance/motion signal separator 411, and generates a luminance signal having a full bandwidth. The D-A converter 460 converts the unfolded digital luminance signal supplied from the frequency unfolder 450 into an analog form.

The chrominance signal reproducer 470 amplitude-modulates the amplitude-modulated chrominance signal and generates a chrominance signal. The chrominance signal includes motion signals when reproducing the video tape on which video signals are recorded by a video cassette recorder to which the circuits of this invention are applied.

A-D converter 431 converts the demodulated chrominance signal into a digital chrominance signal.

The chrominance/motion signal separator 411 separates the digital chrominance signal into the motion signal and the chrominance signal, and supplies the motion signal to frequency unfolder 450, and supplies the chrominance signal to D-A converter 461.

D-A converter 461 converts the digital chrominance signal inputted from the chrominance/motion signal separator 411 into an analog form.

The composite video signal generator 480 mixes the luminance signal output from the D-A converter 460 and the chrominance signal output from the other D-A converter 461 to form a standard composite video signal. The composite video signal generator 480 supplies the standard composite video signal to display apparatus.

As described above, this invention enables recording of information on the phase of the folding carrier wave which changes according to fields by inserting the information in the luminance signal, separating of frequency folding information inserted in the luminance signal, and accurately unfolding the high frequency luminance signal components included in low frequency luminance signal components into the original band during reproduction by recording frequency folding information with the luminance signal.

What is claimed is:

1. A frequency folding information inserting circuit in a video processing apparatus for folding a high frequency video signal into a low frequency video signal and recording the folded video signal on a recording medium having a limited bandwidth, said circuit comprising:

an even/odd number field detector for detecting whether current fields of said folded video signal are one of an even number field and an odd number field, and for generating an even/odd number field detector signal having different logic states;

a frequency folding information generator for responding to said even/odd number field detector signal to generate frequency folding information representing a frequency folding state of said folded video signal;

an adder for inserting said frequency folding information into the folded video signal; and a position setter connected between said frequency folding information generator and said adder, and for supplying said frequency folding information to said adder when reaching a position where the frequency folding information is to be inserted into the folded video signal.

2. A frequency folding information inserting circuit as claimed in claim 1, wherein said position of insertion of said frequency folding information is set between one vertical synchronous signal and a next vertical synchronous signal.

3. A frequency folding information inserting circuit as claimed in claim 2, wherein said position of insertion of said frequency folding information is set between an arbitrary horizontal synchronous signal and a next horizontal synchronous signal in an interval of one vertical synchronous signal.

4. A frequency folding information inserting circuit as claimed in claim 3, wherein said frequency folding information is positioned during any arbitrary horizontal scanning period.

5. A video processing apparatus as claimed in claim 1, further comprising:

a luminance reproducer for reproducing a folded luminance signal from the folded video signal recorded on said recording medium;

a position detector for detecting the insertion position of the frequency folding information inserted in the reproduced luminance signal in response to synchronous signals; and a frequency folding information separator for separating the frequency folding information inserted in said reproduced luminance signal in response to the detected result of said position detector and supplying the separated frequency folding information to a frequency unfolder for generating an unfolded luminance signal.

6. A video processing apparatus as claimed in claim 5, wherein said position detector comprises a synchronous signal separator for separating the synchronous signals from the reproduced luminance signal.

7. A frequency folding information generating method for representing a frequency folding state of a folded video signal in a video recording apparatus for folding a high frequency video signal into a low frequency video signal and for recording the folded video signal of a full bandwidth on a recording medium of a limited bandwidth, said method comprising:

separating a horizontal synchronous signal and a vertical synchronous signal from the folded video signal including horizontal and vertical synchronous signals;

generating a standard clock pulse train having a frequency higher than that of the horizontal synchronous signal;

counting a scanning period of the horizontal synchronous signal according to said standard clock pulse train;

comparing the counted value with a value corresponding to a half-period of the horizontal synchronous signal when a blanking duration of the vertical synchronous signal starts during the counting of said scanning period;

generating an even/odd number field detection signal of a predetermined logic state according to the compared result;

generating frequency folding information according to the logic state of said even/odd number field detection signal; and setting a position in a scanning line for inserting said frequency folding information into the folded video signal.

8. A frequency folding information generating method as claimed in claim 7, wherein a value of said frequency folding information is increased by one for every inversion of the logic state of the even/odd number field detector signal in said generating step of said frequency folding information.

9. A frequency folding information generating method as claimed in claim 8, wherein said frequency folding information takes a low logic value after reaching a specified value in said generating step of said frequency folding information.

10. A frequency folding information generating method as claimed in claim 9, wherein said frequency folding information takes said low logic value after reaching a value of three.

11. A frequency folding information generating method as claimed in claim 7, wherein said frequency folding information is a pulse in which an inserting position of the pulse is slightly altered for each field.

12. A frequency folding information generating method as claimed in claim 7, wherein said frequency folding information is an impulse in which an inserting position of the impulse is slightly altered for each field.

13. A frequency folding information generating method as claimed in claim 7, wherein said frequency folding information is a code word with the inserting position fixed.

14. A frequency folding information generating method as claimed in claim 7, wherein said frequency folding information is generated to be inserted in only one of four fields comprising a frame of the video signals in said generating step of the frequency folding information.

15. A frequency folding information generating method as claimed in claim 7, wherein said frequency folding information is generated to be inserted in only any two fields of four fields comprising a frame of the video signals.

16. A frequency folding information generating method as claimed in claim 7, wherein said frequency folding information is generated to be inserted in only any three fields of four fields of the video signals.

17. A video recording apparatus, comprising:

means for separating chrominance signals and luminance signals from received composite video signals;

means for generating folded luminance signals by frequency folding a high frequency component of said luminance signals onto a low frequency component of said luminance signals;

means for separating synchronous signals contained in said folded luminance signals;

field count detector means for generating count information by counting fields in each frame of said folded luminance signals in response to said synchronous signals;

information generating means for generating count signals representing said count information;

means for generating folded field count luminance signals by combining said count signals and said folded luminance signals;

means for generating modulated luminance signals by modulating said folded field count luminance signals;

means for generating modulated chrominance signals by modulating said chrominance signals;

means for combining said modulated chrominance signals and said modulated luminance signals to generate combined signals; and means for recording said combined signals on a recording medium.

18. A video recording apparatus as claimed in claim 17, wherein said folded field count luminance signals generating means comprises:

position setting means for delaying said count signals in response to counts of horizontal synchronous signals of said synchronous signals; and adding means for adding said count signals delayed by said position setting means to said folded luminance signals thereby generating said folded field count luminance signals having said count signals added to predetermined horizontal scan lines of said folded luminance signals.

19. A video recording apparatus as claimed in claim 17, further comprising:

means for separating motion signals from said received composite video signals, said motion signals representing image motion in said received composite video signals; and means for combining said motion signals and said chrominance signals prior to modulation of said chrominance signals.

20. A video recording apparatus as claimed in claim 19, wherein said luminance signals are separated from said received composite video signals in response to motion signals.

21. A video recording apparatus as claimed in claim 17, further including playback capability comprising:

a chrominance/luminance signal separator for separating modulated chrominance signals and modulated-folded luminance signals from video signals representing said combined signal reproduced from said recording medium;

a chrominance signal reproducer for generating demodulated chrominance signals by demodulating said modulated chrominance signals;

a luminance reproducer for reproducing the folded luminance signals by demodulating said modulated-folded luminance signals;

position detector means for counting the synchronous signals included in said folded luminance signals to generate position detection signals indicative of insertion positions of said count signals combined in said folded luminance signals frequency folding information separator means for separating said count signals from said folded luminance signals in response to said position detection signals;

means for unfolding the high frequency component from the low frequency component of said folded luminance signals in response to said count signals to generate unfolded luminance signals; and means for generating composite video signals by combining said demodulated chrominance signals and said unfolded luminance signals.

22. A method of inserting frequency folding information into an analog folded luminance signal, comprising the steps of:

sampling a composite video signal in dependence upon a clock pulse and encoding said composite video signal to generate a digital composite video signal;

separating motion signals, spatially derived luminance signals, and temporally derived luminance signals from said digital composite video signal;

mixing said spatially derived luminance signals and said temporarily derived luminance signals in dependence upon said motion signal to produce a mixed luminance signal;

attenuating and sampling high frequency components of said mixed luminance signal;

mixing said high frequency components with low frequency luminance signals to generate a folded luminance signal;

converting said folded luminance signal into an analog folded luminance signal; and inserting said frequency folding information into said analog folded luminance signal, said frequency folding information representing a frequency folding state of said analog folded luminance signal and being obtained based upon detection of whether a current field of said analog folded luminance signal is one of an even number field and an odd number field.

* * * * *